(12) United States Patent
Lay

(10) Patent No.: US 6,467,596 B2
(45) Date of Patent: Oct. 22, 2002

(54) ONE-WAY RATCHET MECHANISM

(76) Inventor: Gwo-Rong Lay, No. 24, Alley 1, Lane 21, Sec. 2, Fu-Shing Rd., Tan-Tz Town, Tai-Chung Hsien (TW)

( * ) Notice: Subject to any disclaimer, the term of this patent is extended or adjusted under 35 U.S.C. 154(b) by 13 days.

(21) Appl. No.: 09/726,989

(22) Filed: Nov. 30, 2000

(65) Prior Publication Data

US 2001/0003107 A1 Jun. 7, 2001

(30) Foreign Application Priority Data

Dec. 2, 1999 (TW) .................................... 088220731 U

(51) Int. Cl.⁷ .............................................. F16D 41/07
(52) U.S. Cl. ......................................... 192/45; 192/38
(58) Field of Search .................... 192/45, 45.1, 43, 192/44, 41 R, 37, 38

(56) References Cited

U.S. PATENT DOCUMENTS

| | | | | | |
|---|---|---|---|---|---|
| 4,735,299 A | * | 4/1988 | Ohuchi | ......................... | 192/45 |
| 4,754,859 A | * | 7/1988 | Ouchi et al. | .................. | 192/45 |

FOREIGN PATENT DOCUMENTS

| | | | |
|---|---|---|---|
| JP | 61-31730 A | * | 2/1986 |
| JP | 62-9035 A | * | 1/1987 |

* cited by examiner

Primary Examiner—Saul Rodriguez
(74) Attorney, Agent, or Firm—Charles E. Baxley

(57) ABSTRACT

A one-way ratchet mechanism includes a ratchet wheel injection-molded from plastics and fastened to a hub of a flywheel, the ratchet wheel having a center axle hole, which receives a transmission shaft, a plurality of inside notches equiangularly spaced around the center axle hole, and a plurality of trapezoidal positioning grooves respectively disposed at one end of each inside notch, a plurality of constraint plates respectively fitted into the positioning grooves and defining with the transmission shaft a respective wedge-like constraint space, a plurality of springs respectively mounted in the inside notches at one end, and a plurality of needle rollers respectively supported on the springs and moved between two ends of each wedge-like constraint space defined between the constraint plates and the transmission shaft to control one-way rotation of the ratchet wheel upon rotation of the transmission shaft.

9 Claims, 7 Drawing Sheets

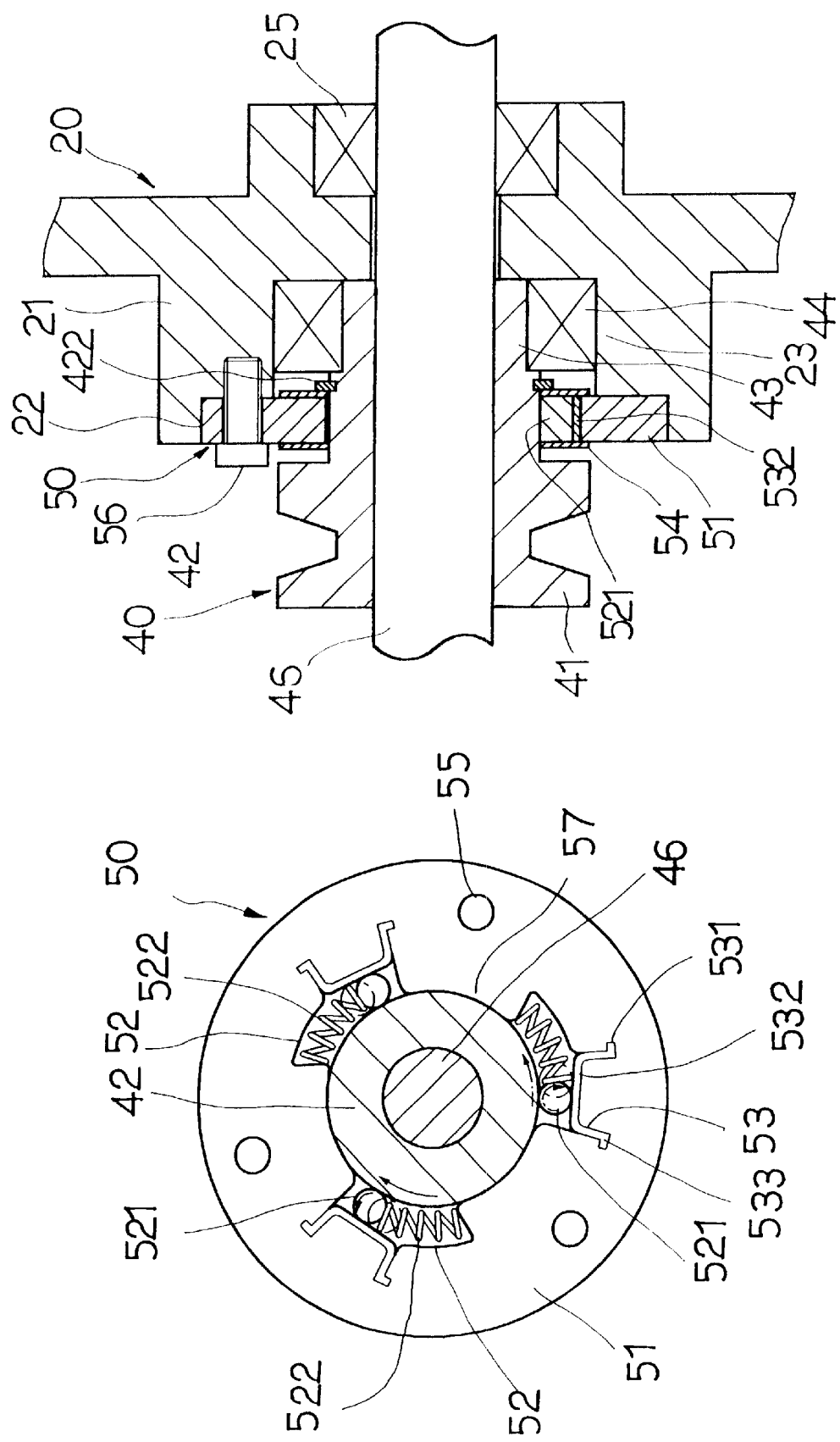

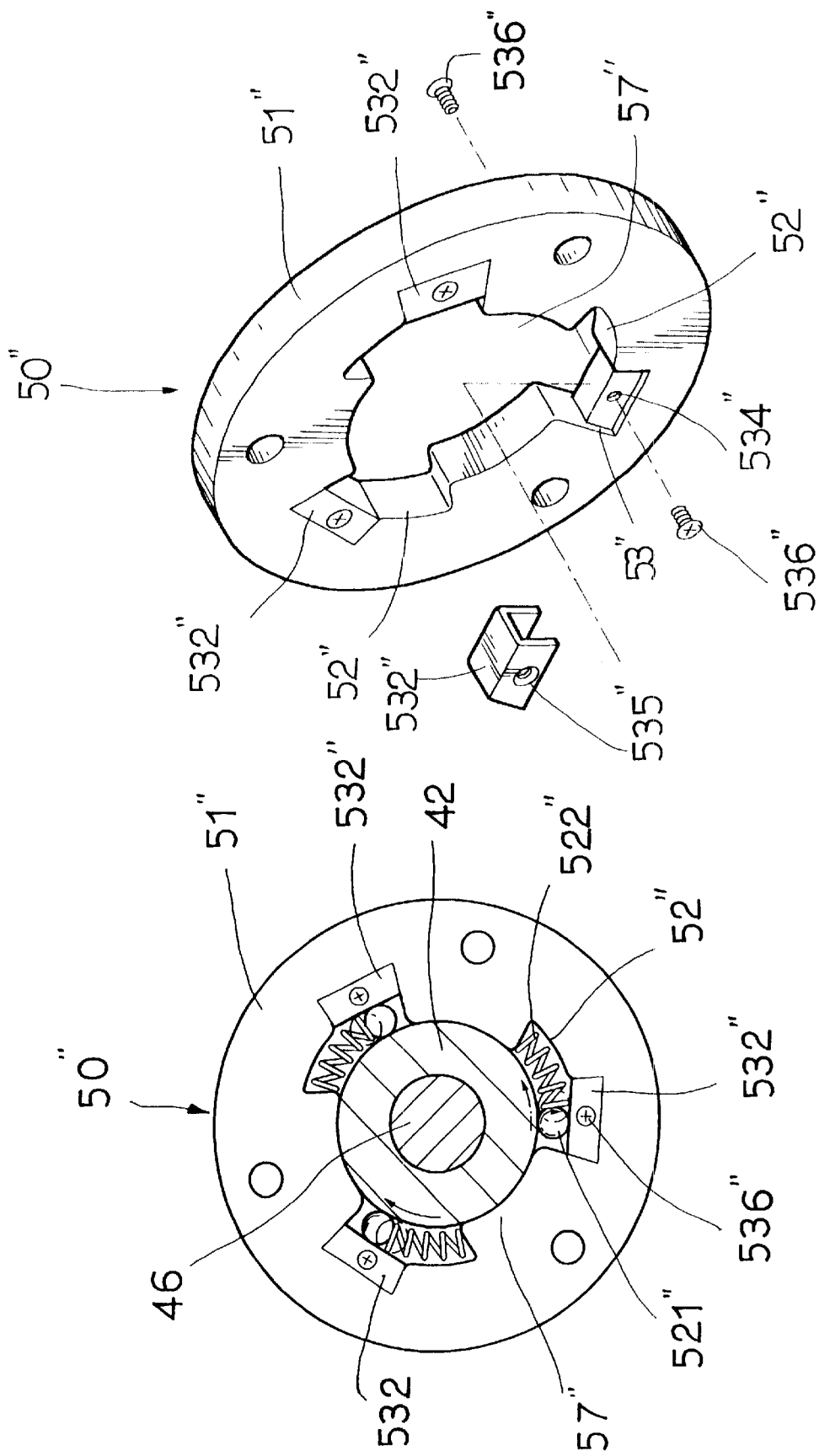

US 6,467,596 B2

1

ONE-WAY RATCHET MECHANISM

BACKGROUND OF THE INVENTION

The present invention relates to a one-way ratchet mechanism and, more particularly, to an improved structure of one-way ratchet mechanism adapted for use with a flywheel in a stationary bicycle.

FIG. 1 shows a conventional stationary bicycle. This structure of stationary bicycle comprises a frame, a saddle, a handle, a counter, a flywheel, a one-way ratchet mechanism, and a transmission shaft. As illustrated in FIGS. 2 and 3, the flywheel comprises a hub defining a mounting chamber and a bearing chamber in the mounting chamber. The one-way ratchet mechanism is received in the mounting chamber of the hub and mounted on the transmission shaft, which is supported in an axle bearing in the bearing chamber. When the user pedals the pedals to turn the transmission belt forwards, the transmission shaft is driven to rotate the one-way ratchet mechanism and the flywheel. One the contrary, when the user pedals the pedals in the reversed direction, the needle rollers in the ratchet wheel of the ratchet mechanism run idle, and the ratchet wheel does no work, and therefore the flywheel is immovable.

According to the aforesaid ratchet mechanism, the ratchet wheel is made of metal by stamping, and must be processed through a surface processing process and then treated with a heat treatment after stamping. This complicated fabrication method greatly increases the cost of the ratchet mechanism.

SUMMARY OF THE INVENTION

The present invention has been accomplished to provide a one-way ratchet mechanism, which eliminates the aforesaid drawback. According to one aspect of the present invention, the one-way ratchet mechanism comprises a ratchet wheel fastened to a hub of a flywheel, the ratchet wheel having a center axle hole, which receives a transmission shaft, a plurality of inside notches equiangularly spaced around the center axle hole, and a plurality of positioning grooves respectively disposed at one end of each inside notch, a plurality of constraint plates respectively fitted into the positioning grooves and defining with the transmission shaft a respective wedge-like constraint space, a plurality of springs respectively mounted in the inside notches at one end, and a plurality of needle rollers respectively supported on the springs and moved between two ends of each wedge-like constraint space defined between the constraint plates and the transmission shaft to control one-way rotation of the ratchet wheel upon rotation of the transmission shaft. According to another aspect of the present invention, the ratchet wheel is injection-molded from hard plastics, aluminum, or tin, therefore the manufacturing cost of the ratchet wheel is low. According to another aspect of the present invention, the constraint plates are made of metal to protect the ratchet wheel against friction. Because the fabrication and installation of the constraint plates are easy, the one-way ratchet mechanism of the present invention achieves high economic effect and practical value.

2

Figure 1:
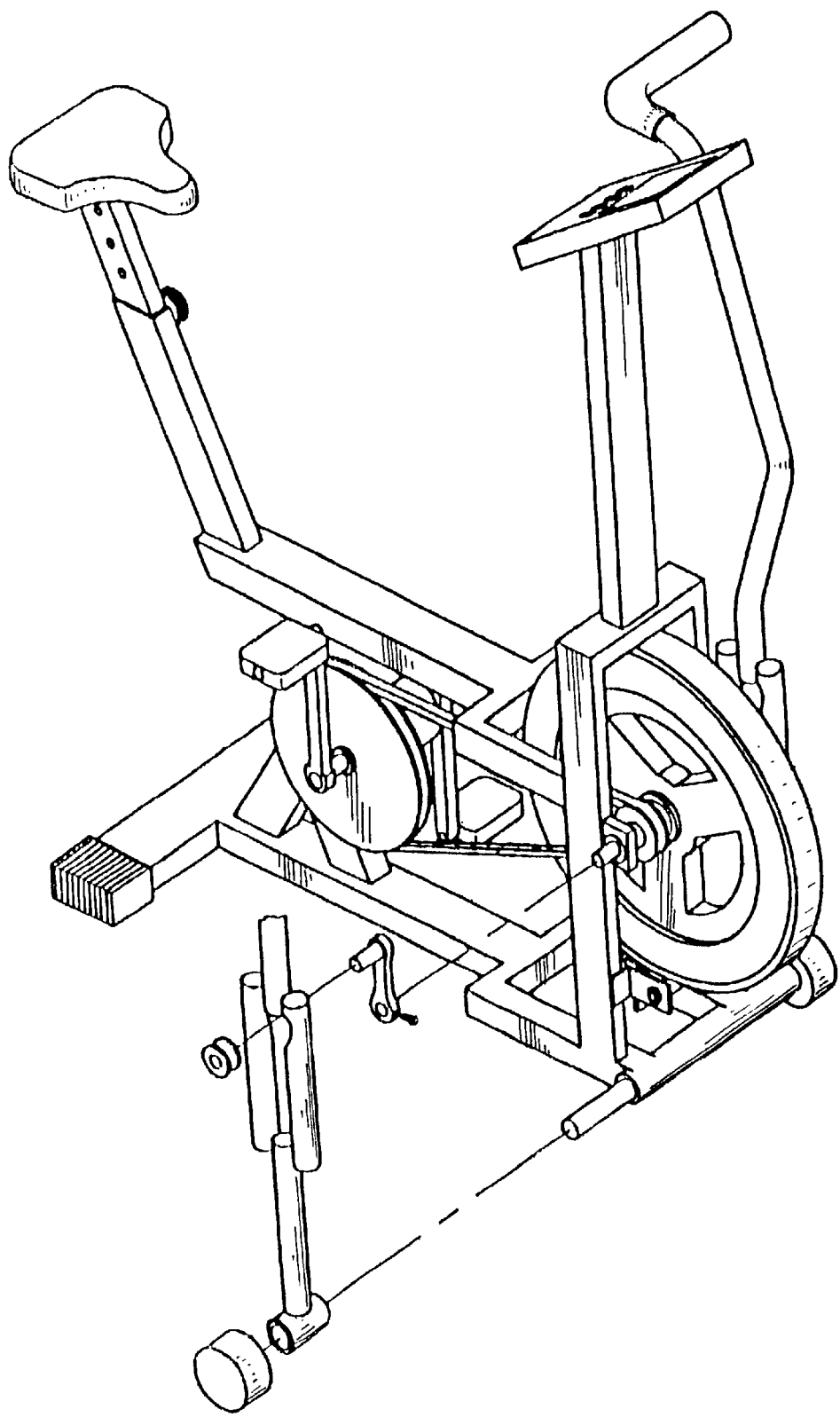
FIG. 1 illustrates a conventional stationary bicycle.
Figure 2:
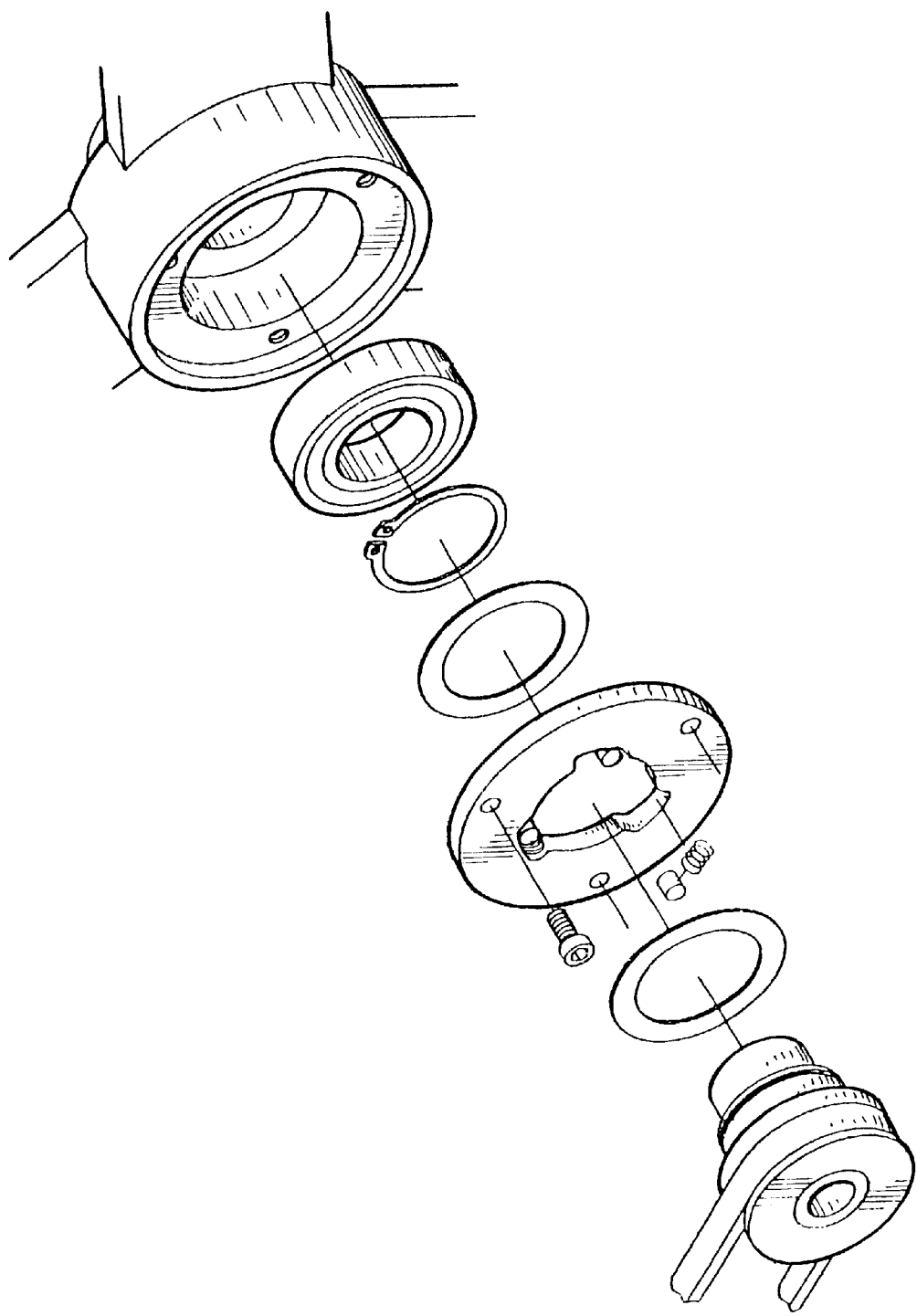
FIG. 2 is an exploded view of a one-way ratchet mechanism according to the prior art.
Figure 3:
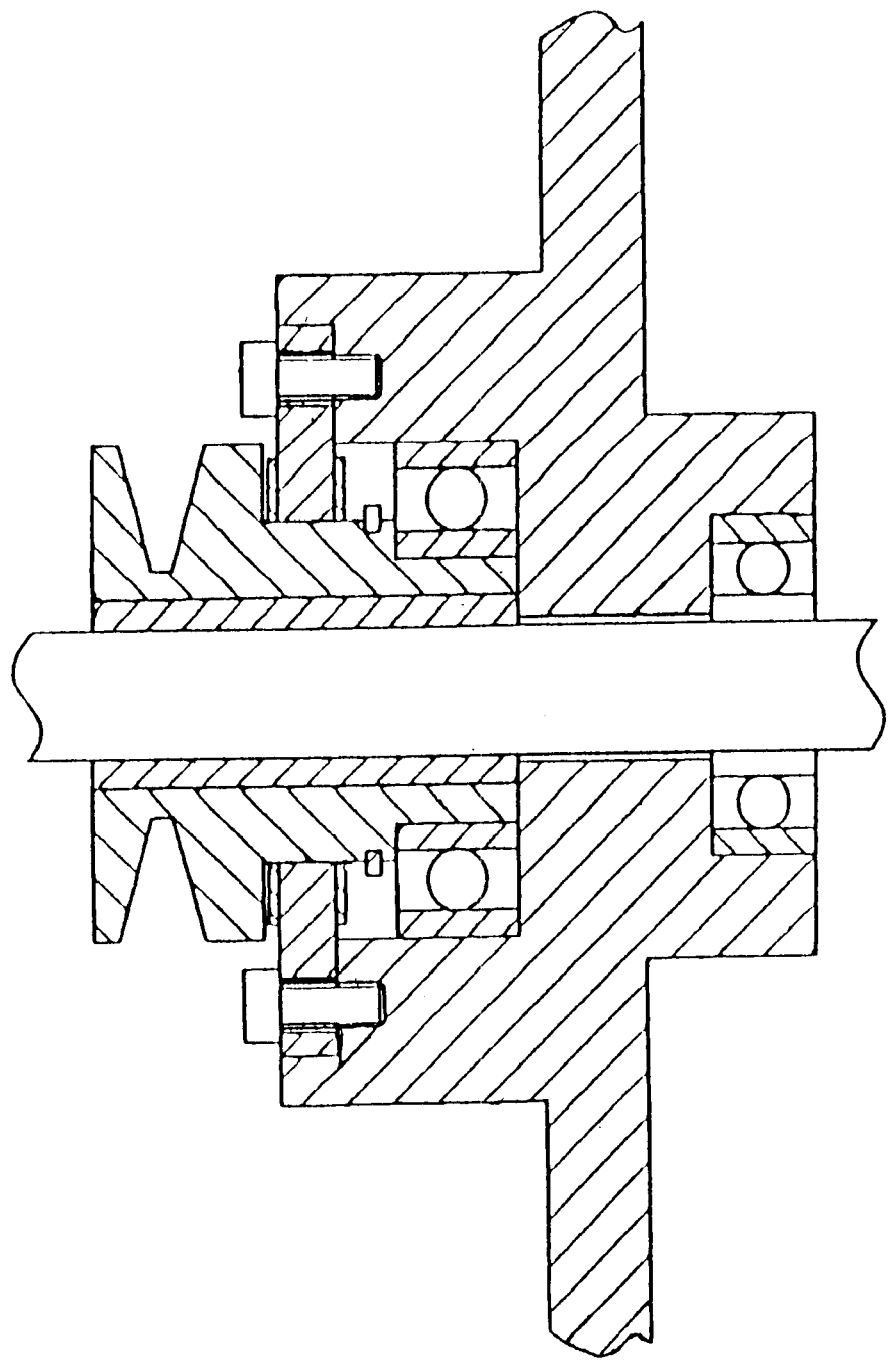
FIG. 3 is a sectional assembly view of the one-way ratchet mechanism shown in FIG. 2.
Figure 4:
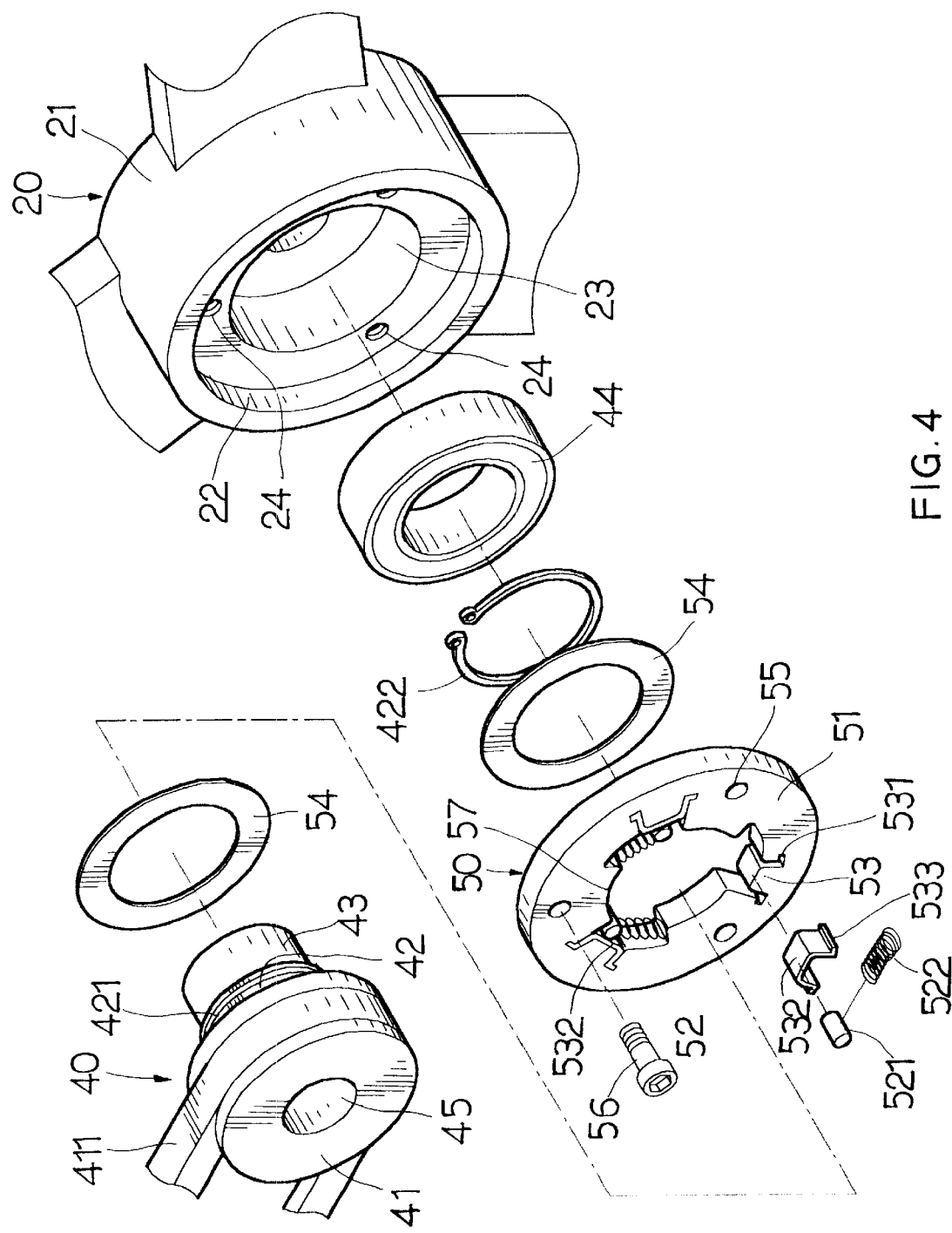

FIG. 4 is an exploded view of the present invention.

FIG. 5 illustrates the operation of the present invention.

FIG. 6 is a sectional assembly view of the present invention.

Figure 7:
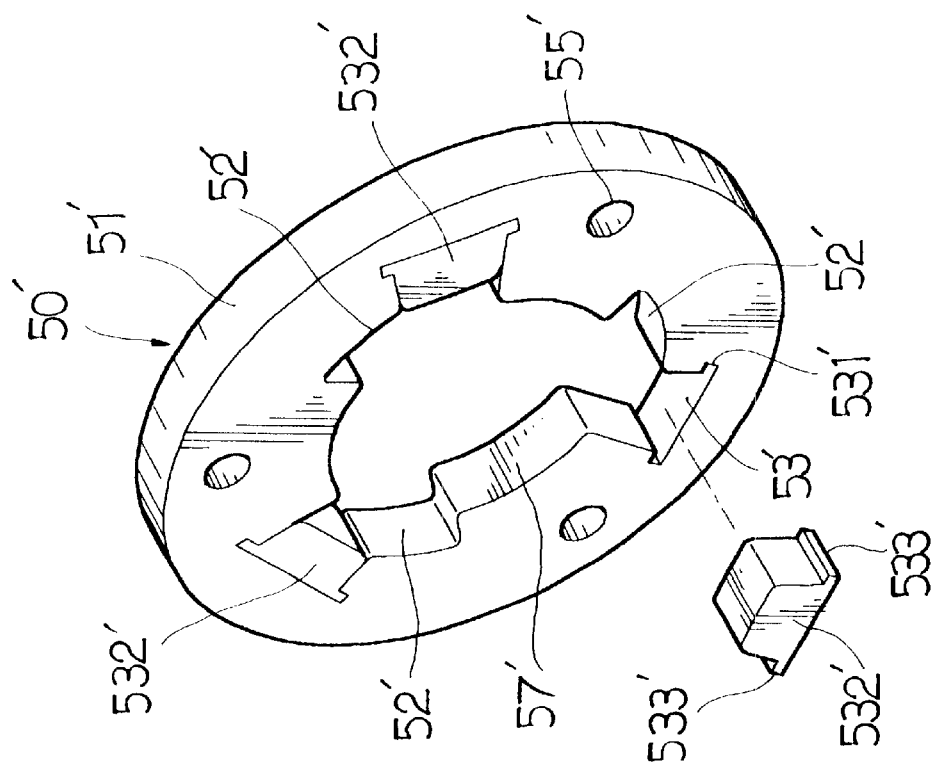

FIG. 7 is an exploded view of a second embodiment of the present invention.

Figure 8:
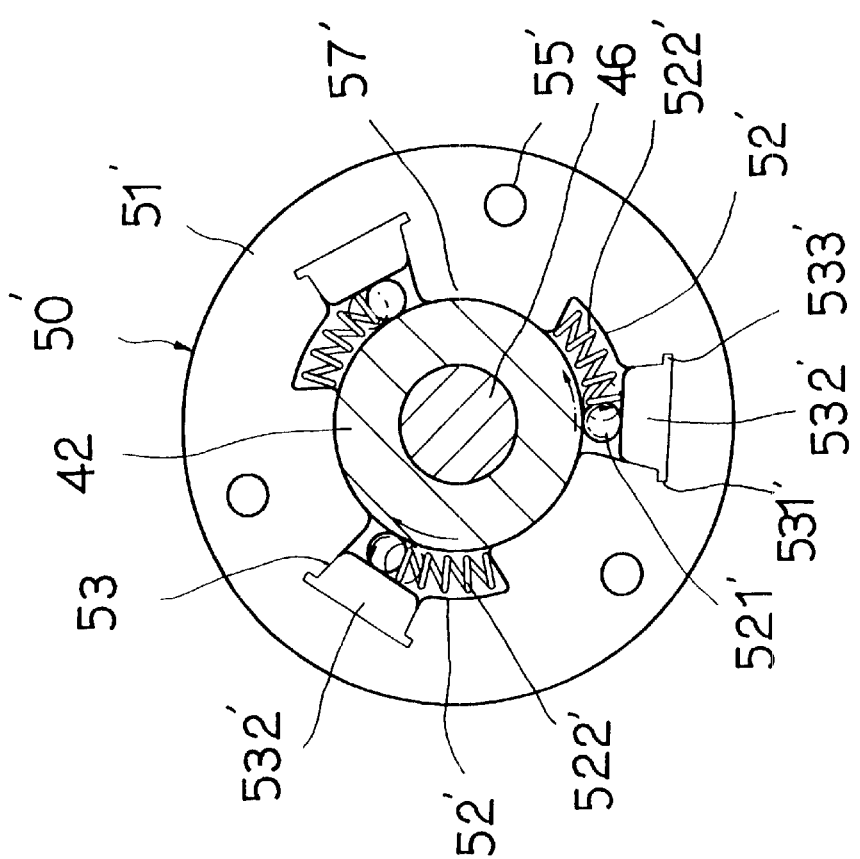

FIG. 8 illustrates the operation of the second embodiment of the present invention.

FIG. 9 is an exploded view of a third embodiment of the present invention.

FIG. 10 illustrates the operation of the third embodiment of the present invention.

DETAILED DESCRIPTION OF THE PREFERRED EMBODIMENT

Referring to FIGS. from 4 through 6, a ratchet mechanism 50 is mounted in a flywheel 20 and coupled to a transmission shaft 40. The flywheel 20 comprises a hub 21 defining a mounting chamber 22 at its one side and a bearing chamber 23 at the center of the mounting chamber 22. The mounting chamber 22 comprises a plurality of screw holes 24 equiangularly spaced around the bearing chamber 23. Further, The other side of the hub 21 is mounted with a flywheel bearing 25. The ratchet mechanism 50 comprises a ratchet wheel 51, two stop rings 54, a plurality of constraint plates 532, a plurality of compression springs 522, and a plurality of needle rollers 521. The ratchet wheel 51 is injection-molded from hard plastics. Alternatively, the ratchet wheel 51 can be molded from aluminum or tin ingot. The ratchet wheel 51 comprises a center axle hole 57, a plurality of inside notches 52 equiangularly spaced around the center axle hole 57, a plurality of substantially U-shaped positioning grooves 53 respectively formed in the inside notches 52, and a plurality of mounting holes 55 corresponding to the screw holes 24 of the hub 21 of the flywheel 20. Each U-shaped positioning groove 53 has two opposite ends extended sideways in reversed directions and forming a respective retaining portion 531. The constraint plates 532 are U-shaped metal plates treated through a heat treatment to reinforce its strength, and respectively mounted in the U-shaped positioning grooves 53 in the ratchet wheel 51, each having two retaining end portions 533 respectively engaged into the retaining portions 531 in the respective U-shaped positioning grooves 53. Each constraint plate 532 defines with the respective inside notch 52 a respective wedge-like space sloping in one direction. The depth of one end of the wedge-like space is smaller than the diameter of the needle rollers 521, however the depth of the other end of the wedge-like space is greater than the diameter of the needle rollers 521. The compression springs 522 are respectively mounted in the inside notches 52. The needle rollers 521 respectively supported on the compression springs 522 in the inside notches 52 and moved in the respective wedge-like spaces in the inside notches 52. The stop rings 54 are mounted at two sides of the ratchet wheel 51 to stop the compression springs 522 and the needle rollers 521 in the respective inside notches 52. Further, screw bolts 56 are respectively inserted through the mounting holes 55 of the ratchet wheel 51 and threaded into the screw holes 24 of the hub 21 to secure the ratchet wheel 51 to the mounting chamber 22 of the hub 21 of the flywheel 20. The transmission shaft 40 has a front end 43 mounted with an axle bearing 44 in the bearing chamber 23 of the hub 21 of the flywheel 20, a middle part 42 positioned in the center axle hole 57 of the ratchet wheel 51, an outside annular groove 43 disposed around the periphery between the front end 43 and the middle part 42, a C-shaped clamp 422 fastened to the outside annular groove 43 to secure the transmission shaft 40 to the ratchet wheel 51, a rear end fixedly mounted with a belt wheel 41, and an axial center hole 45 coupled to an axle 46 at the stationary bicycle. The belt wheel 41 is coupled to a transmission belt 411. When the user operates the pedals of the stationary bicycle to turn the transmission belt 411 and the belt wheel 41 forwards, the transmission shaft 40 is rotated to move the needle rollers 521 in one direction in the respective inside notches 52 and jammed between the middle part 42 of the transmission shaft 40 and the constraint plates 532 (see the real line position shown in FIG. 5), thereby causing the flywheel 20 to be rotated with the transmission shaft 40.

On the contrary, when the user operates the pedals of the stationary bicycle to turn the transmission belt 411 and the belt wheel 41 backwards, the transmission shaft 40 is rotated to move the needle rollers 521 in the reversed direction in the respective inside notches 52 to the wide end of each wedge-like space (see the imaginary line position shown in FIG. 5), enabling the needle rollers 521 to be respectively rotated on their own axis, and therefore the ratchet wheel 50 runs idle without moving the flywheel 20.

As indicated above, the ratchet wheel 51 is injection-molded from plastics, aluminum, or tin, the manufacturing cost of the ratchet wheel 51 according to the present invention is much cheaper than the conventional stamping method. When molded, the ratchet wheel 51 has a smooth peripheral surface, and no further grinding or polishing processing procedure is required. Further, the constraint plates 532 are made of metal that protect the ratchet wheel 51 against friction. Therefore, the ratchet wheel 51 does not wear quickly with use. Because the constraint plates 532 are separately made and treated with a heat treatment, they can be easily installed in the ratchet wheel 51, and the replacement of the constraint plates 532 is also easy.

FIGS. 7 and 8 show an alternate form of the ratchet mechanism according to the present invention. According to this alternate form, the ratchet mechanism 50' comprises a ratchet wheel 51', a plurality of block-like constraint plates 532', a plurality of compression springs 522', and a plurality of needle rollers 521'. The ratchet wheel 51' is injection-molded from, for example, plastics, comprising a center axle hole 57', which receives the middle part 42 of the transmission shaft 40, a plurality of inside notches 52' spaced around the center axle hole 57', and a plurality of trapezoidal positioning grooves 53' respectively disposed at one end of each inside notch 52'. Each positioning groove 53' having two retaining portions 531' at two opposite ends. The block-like constraint plate 532' are respectively mounted in the positioning grooves 53', each having two retaining end portions 533 respectively engaged into the retaining portions 531' of the positioning grooves 53'. The block-like constraint plates 532' define with the respective inside notches 52' a respective wedge-like constraint space. The compression springs 522' are respectively mounted in the inside notches 52'. The needle rollers 521' are respectively supported on the compression springs 522' and moved between two ends of the wedge-like constraint space in each inside notch 52'. When rotating the transmission shaft 40 forwards or backwards, the middle part 42 of the transmission shaft 40 forces the needle rollers 521' toward one end (the wide end or the narrow end) of each wedge-like constraint space, thereby causing the ratchet wheel 51' to be secured to or released from the transmission shaft 40, enabling the flywheel 20 to be rotated in one direction.

FIGS. 9 and 10 show another alternate form of the ratchet mechanism. According to this alternate form, the ratchet mechanism 50" comprises a ratchet wheel 51" injection molded from, for example, plastics, a plurality of U-shaped constraint plates 532", a plurality of compression springs 522", and a plurality of needle rollers 521". The ratchet wheel 51" comprises a center axle hole 57", which receives the middle part 42 of the transmission shaft 40, a plurality of inside notches 52" spaced around the center axle hole 57", pairs of U-shaped positioning grooves 53" respectively bilaterally disposed at one end of each inside notch 52'", and a plurality of mounting holes 534" respectively extended between each pair of positioning grooves 53". The U-shaped constraint plate 532" are respectively mounted in the positioning grooves 53", each having a mounting hole 535" respectively fastened to the mounting holes 534" by a respective fastening element, for example, a screw 536". The U-shaped constraint plates 532" define with the respective inside notches 52" a respective wedge-like constraint space. The compression springs 522" are respectively mounted in the inside notches 52". The needle rollers 521" are respectively supported on the compression springs 522" and moved between two ends of the wedge-like constraint space in each inside notch 52". When rotating the transmission shaft 40 forwards or backwards, the middle part 42 of the transmission shaft 40 forces the needle rollers 521" toward one end (the wide end or the narrow end) of each wedge-like constraint space, thereby causing the ratchet wheel 51" to be secured to or released from the transmission shaft 40, enabling the flywheel 20 to be rotated in one direction.

It is to be understood that the drawings are designed for purposes of illustration only, and are not intended for use as a definition of the limits and scope of the invention disclosed.

What the invention claimed is:

1. A one-way ratchet mechanism coupled between a flywheel and a transmission shaft, said ratchet mechanism comprising:

a ratchet wheel injection-molded from plastic, said ratchet wheel comprising a center axle hole which receives said transmission shaft, a plurality of inside notches equiangularly spaced around said center axle hole, and a plurality of substantially U-shaped positioning grooves respectively disposed at an end of each of said inside notches, said positioning grooves each having two opposite ends respectively extending sideways in directions away from each other and forming two retaining portions;

a plurality of constraint plates each respectively mounted in an associated one of said positioning grooves, each of said constraint plates having two retaining end portions with each of the retaining end portions respectively engaged into an associated one of the retaining portions of said associated positioning groove;

a plurality of springs each respectively mounted in an associated one of said inside notches at said end of the associated one of said notches;

a plurality of needle rollers each having a diameter and each respectively supported on an associated one of said springs and moveable between two ends of a space defined between said associated one of said constraint plates and said transmission shaft.

2. The one-way ratchet mechanism of claim 1, wherein each of said constraint plates defines with said transmission shaft a respective wedge-like constraint space adapted to receive said associated one of said needle rollers respectively, said wedge-like constraint space having a narrow end and a wide end, depth of said narrow end being smaller than the diameter of said associated needle roller, depth of said wide end being greater than the diameter of said associated needle roller; said needle rollers respectively moveable between the wide end and the narrow end of the respective associated wedge-like constraint space between said transmission shaft and each of their respective said constraint plate so that said ratchet wheel is rotated with said transmission shaft upon a first sense of rotation of said transmission shaft and runs idle upon a sense of rotation of said transmission shaft opposite to said first sense.

3. A one-way ratchet mechanism of claim 1, wherein said constraint plates are made of metal and subjected to heat treatment.

4. A one-way ratchet mechanism coupled between a flywheel and a transmission shaft, said ratchet mechanism comprising:

a ratchet wheel injection-molded from plastic, said ratchet wheel comprising a center axle hole which receives said transmission shaft, a plurality of inside notches equiangularly spaced around said center axle hole, and a plurality of trapezoidal positioning grooves respectively disposed at an end of each of said inside notches, said positioning grooves each having two opposite ends respectively extending sideways in directions away from each other and forming two retaining portions;

a plurality of block-like constraint plates each respectively fitted into an associated one of said positioning grooves, each of said constraint plates having two retaining end portions with each of the retaining end portions respectively engaged into an associated one of the retaining portions of said associated positioning groove;

a plurality of springs each respectively mounted in an associated one of said inside notches at said end an associated one of said notches; and a plurality of needle rollers each having a diameter and each respectively supported on an associated one of said springs and moveable between two ends of a space defined between said associated one of said constraint plates and said transmission shaft.

5. The one-way ratchet mechanism of claim 4, wherein each of said constraint plates defines with said transmission shaft a respective wedge-like constraint space adapted to receive said associated one of said needle rollers respectively, said wedge-like constraint space having a narrow end and a wide end, depth of said narrow end being smaller than the diameter of said associated needle roller, depth of said wide end being greater than the diameter of said associated needle roller; said needle rollers respectively moveable between the wide end and the narrow end of each of their respective associated wedge-like constraint space between said transmission shaft and each of their respective said constraint plate so that said ratchet wheel is rotated with said transmission shaft upon a first sense of rotation of said transmission shaft and runs idle upon a sense of rotation of said transmission shaft opposite to said first sense.

6. The one-way ratchet mechanism of claim 4, wherein said constraint plates are made of metal and subjected to heat treatment.

7. A one-way ratchet mechanism coupled between a flywheel and a transmission shaft, said ratchet mechanism comprising:

a ratchet wheel injection-molded from plastic, said ratchet wheel comprising a center axle hole which receives said transmission shaft, a plurality of inside notches equiangularly spaced around said center axle hole, a pair of U-shaped positioning grooves each respectively disposed at one end of each of said inside notches, and a plurality of mounting holes respectively defined between each of said pairs of U-shaped positioning grooves;

a plurality of constraint plates each respectively mounted in an associated one of said pairs of positioning grooves at one end of each of said inside notches, said constraint plates each having a mounting hole respectively fastened to the mounting holes of said ratchet wheel by a respective fastening element;

a plurality of springs each respectively mounted in an associated one of said inside notches at one end; and a plurality of needle rollers each having a diameter and each respectively supported on an associated one of said springs and moveable between two ends of a space defined between said associated one of constraint plates and said transmission shaft.

8. The one-way ratchet mechanism of claim 7, wherein each of constraint plates defines with said transmission shaft a respective wedge-like constraint space adapted to receive said associated one of needle rollers respectively, said wedge-like constraint space having a narrow end and a wide end, depth of said narrow end being smaller than the diameter of said associated needle roller, depth of said wide end being greater than the diameter of said associated needle roller; said needle rollers respectively moveable between the wide end and the narrow end of each of their respective associated wedge-like constraint space between said transmission shaft and each of their respective said constraint plate so that said ratchet wheel is rotated with said transmission shaft upon a first sense of rotation of said transmission shaft and runs idle upon a sense of rotation of said transmission shaft opposite to said first sense.

9. The one-way ratchet mechanism of claim 7, wherein said constraint plates are made of metal and subjected to heat treatment.

* * * * *